United States Patent [19]

Tateoka

[11] 4,370,032
[45] Jan. 25, 1983

[54] PROJECTION LENS

[75] Inventor: Masamichi Tateoka, Tokyo, Japan

[73] Assignee: Canon Kabushiki Kaisha, Tokyo, Japan

[21] Appl. No.: 199,660

[22] Filed: Oct. 22, 1980

[30] Foreign Application Priority Data

Oct. 29, 1979 [JP] Japan .................. 54-140043

[51] Int. Cl.³ .................................................. G02B 9/14
[52] U.S. Cl. ...................................................... 350/476
[58] Field of Search ......................................... 350/476

[56] References Cited

U.S. PATENT DOCUMENTS 3,876,292 4/1975 Velesik .................................. 350/476
4,264,139 4/1981 Maeda .................................. 350/476

FOREIGN PATENT DOCUMENTS 54-99426 8/1979 Japan .................................. 350/476

Primary Examiner—John K. Corbin
Assistant Examiner—Scott J. Sugarman
Attorney, Agent, or Firm—Fitzpatrick, Cella, Harper & Scinto

[57] ABSTRACT

A compact projection lens for projecting a predetermined area of an original surface upon a solid image pick-up element in original reading such as facsimile or the like, characterized in that F-number is bright, the projection lens has a high resolving power and a high contrast, that is, spherical aberration, coma, curvature of field and distortion are well corrected and the opening efficiency is 100% and magnification is used in the vicinity of 1/10 time.

8 Claims, 17 Drawing Figures

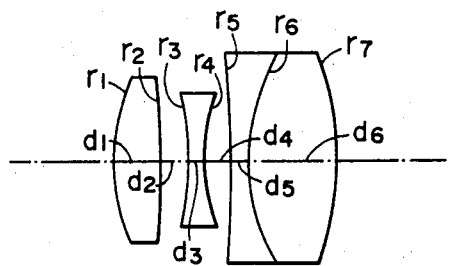
FIG. IA
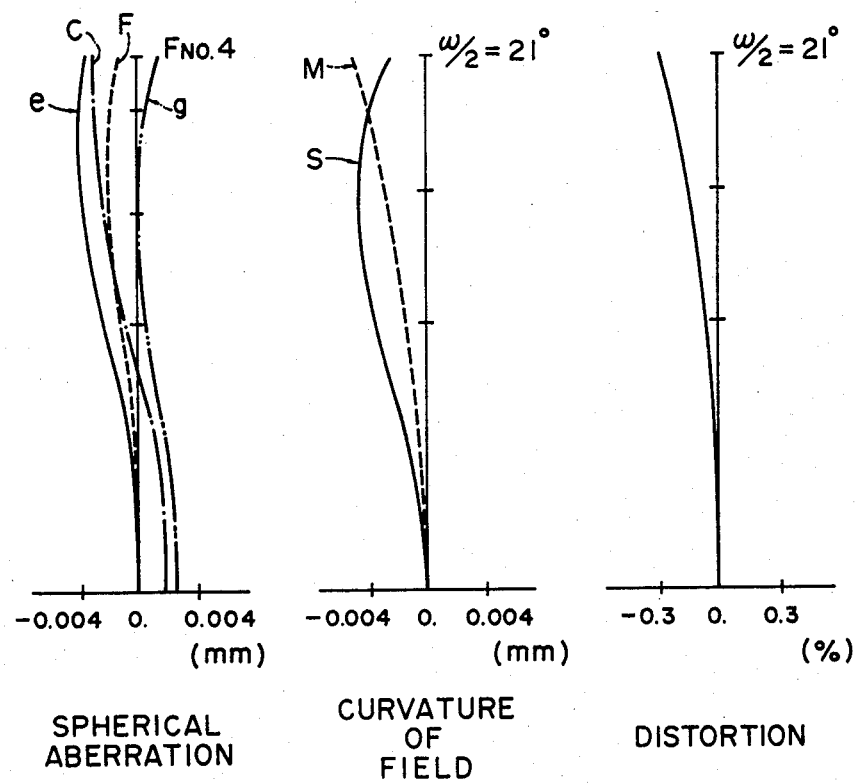
FIG. IB

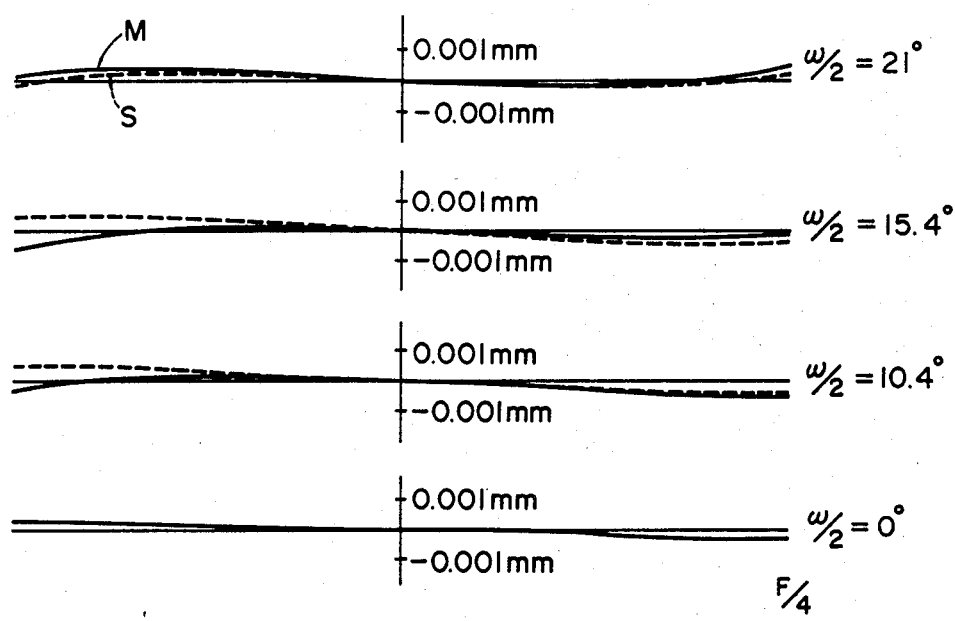
FIG. IC

PROJECTION LENS

BACKGROUND OF THE INVENTION

1. Field of the Invention

This invention relates to a projection lens in which magnification is used in the vicinity of 1/10 times and F-number is relatively bright and various aberrations are well corrected and which is inexpensive.

2. Description of the Prior Art

In recent years, a method has been adopted in which a solid image pick-up element is used as the scanning means in facsimile and this is disposed as a scanning light receiving element in the image plane to scan an original. In this case, where a projection lens is used to transmit the original to the solid image pick-up element, the following points are particularly required in the projection lens. Firstly, the F-number of the lens must be bright because it is desired to increase the exposure amount to the solid image pick-up element per unit of time in order that the original may be scanned at high speed by the use of such element and because it is desired to use a fluorescent lamp of the lowest possible illumination as the lamp for illuminating the original. Secondly, in order to make the facsimile apparatus compact, it is required that the interval between the original and the image plane be made as small as possible and the angle of view of the lens be made as wide as possible. Thirdly, a high resolving power is required because one solid image pick-up element is of the order of 15$\mu$. Fourthly, it is necessary that the quantity of light be equal over the entire area of the solid image pick-up element and therefore, the off-axis opening efficiency of the lens must be 100%. Fifthly, it is necessary that the original surface be uniformly projected, namely, that the distortion be small. Sixthly, the lens must be made inexpensive to make the facsimile apparatus inexpensive.

As a projection lens, the so-called Tessar type one is known from U.S. Pat. No. 2,724,992, Japanese Laid-open Patent Application No. 48233/1979, etc. The present invention is a Tessar type projection lens which satisfies the above-noted requirements.

SUMMARY OF THE INVENTION

It is the object of the present invention to provide a projection lens in which F-number is bright and which has a high resolving power and a high contrast, namely, in which spherical aberration, coma, curvature of field and distortion are well corrected and the opening efficiency is 100% and magnification is used in the vicinity of 1/10 times.

To achieve the above object, the projection lens of the present invention comprises three group of four components, namely, a first group consisting of a biconvex single lens, a second group consisting of a biconcave single lens, and a third group consisting of a positive lens comprising a negative lens and a positive lens cemented together, and satisfies the following conditions:

(1) $1.35 \leq |f_1/f_2| \leq 1.75$
(2) $0.35 \leq |f_2|/f \leq 0.38$
(3) $0.6 \leq d_2/d_4 \leq 1.57$
(4) $0.55 \leq f_3/f \leq 0.73$
(5) $1.26 \leq |r_3|/r_4 \leq 2.18$
(6) $0.15f \leq d_4 + d_6 \leq 0.25f$ where $f_1$ is the focal length of the first group lens, $f_2$ is the focal length of the second group lens, $d_2$ is the air space between the first group lens and the second group lens, $d_4$ is the air space between the second group lens and the third group lens, $r_3$ and $r_4$ are the curvature radii of the third and fourth refracting surfaces from the front, and f is the focal length of the entire system.

The invention will become more fully apparent from the following detailed description thereof taken in conjunction with the accompanying drawings.

BRIEF DESCRIPTION OF THE DRAWINGS

FIG. 1A shows a cross-section of the lens of Embodiment 1 of the present invention.

FIG. 1B shows the various longitudinal aberrations in Embodiment 1.

FIG. 1C shows the lateral aberrations on the Gaussian image plane.

DESCRIPTION OF THE PREFERRED EMBODIMENTS

FIG. 1A shows the cross-sectional shape of a first embodiment of the projection lens according to the present invention. The lens is constituted by three groups of four components, and a first group comprises a biconvex single lens, a second group comprises a biconcave single lens, and a third group comprises a positive lens consisting of a negative lens and a positive lens cemented together.

The numerical values of the lens are as follows:

| $f = 1$ | $F = 1:4$ | Angle of view = 42° | $\beta = -0.0893$ |
|---|---|---|---|
| $r_1 = 0.392$ | $d_1 = 0.0919$ | $n_1 = 1.69401$ | $\nu_1 = 54.8$ |
| $r_2 = -6.9124$ | $d_2 = 0.0592$ | | |
| $r_3 = -0.7147$ | $d_3 = 0.0254$ | $n_2 = 1.61686$ | $\nu_2 = 37.0$ |
| $r_4 = 0.3442$ | $d_4 = 0.063$ | | |
| $r_5 = -6.4695$ | $d_5 = 0.0404$ | $n_3 = 1.70443$ | $\nu_3 = 30.1$ |
| $r_6 = 0.3656$ | $d_6 = 0.1675$ | $n_4 = 1.81077$ | $\nu_4 = 40.9$ |
| $r_7 = -0.6089$ | | | |

$|f_1/f_2| = 1.4399$, $\quad |f_2|/f = 0.3732$, $\quad d_2/d_4 = 0.9392$,

-continued

| | | |
|---|---|---|
| $f_3/f = 0.6688$, | $\|r_3\|/r_4 = 2.0768$, | $d_5 + d_6 = 0.2079f$ | where $r_1, r_2, \ldots$ represent the curvature radii of the successive lens surfaces, $d_1, d_2, \ldots$ represent the thicknesses of the respective lenses and the intervals between adjacent lenses, $n_1, n_2, \ldots$ represent the refractive indices of the respective lenses for E-line (5461 Å), and $\nu_1, \nu_2, \ldots$ represent the Able numbers of the respective lenses.

FIG. 1B shows the longitudinal aberrations of the first embodiment, namely, spherical aberration for each wavelength (C-line, e-line, F-line, g-line), astigmatism (curvature of field, M: Meridional image plane, S: sagittal image plane), and distortion.

FIG. 1C shows the lateral aberrations (coma and flare) with the first embodiment as the representative.

The sum of tertiary aberration coefficients will later be shown in a table with respect to each embodiment.

Figure 2A:
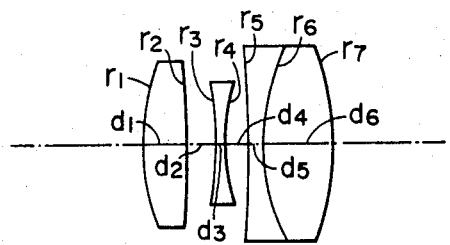
FIG. 2A shows a cross-section of the lens of Embodiment 2 of the present invention.

FIG. 2A shows the cross-sectional shape of a second embodiment of the projection lens according to the present invention. The numerical values of this lens are as follows:

| $f = 1$ | $F = 1:4$ | Angle of view = 42° | $\beta = -0.0893$ |
|---|---|---|---|
| $r_1 = 0.4146$ | $d_1 = 0.0906$ | $n_1 = 1.69401$ | $\nu_1 = 54.8$ |
| $r_2 = -7.2484$ | $d_2 = 0.0648$ | | |
| $r_3 = -0.6537$ | $d_3 = 0.0254$ | $n_2 = 1.61686$ | $\nu_2 = 37.0$ |
| $r_4 = 0.3657$ | $d_4 = 0.0571$ | | |
| $r_5 = -4.3272$ | $d_5 = 0.0317$ | $n_3 = 1.70443$ | $\nu_3 = 30.1$ |
| $r_6 = 0.3574$ | $d_6 = 0.1508$ | $n_4 = 1.81077$ | $\nu_4 = 40.9$ |
| $r_7 = -0.5571$ | | | |
| $\|f_1/f_2\| = 1.5079$, | $\|f_2\|/f = 0.3766$, | $d_2/d_4 = 1.1341$, | |
| $f_3/f = 0.6334$, | $\|r_3\|/r_4 = 1.7874$, | $d_5 + d_6 = 0.1825f$ | |

Figure 2B:
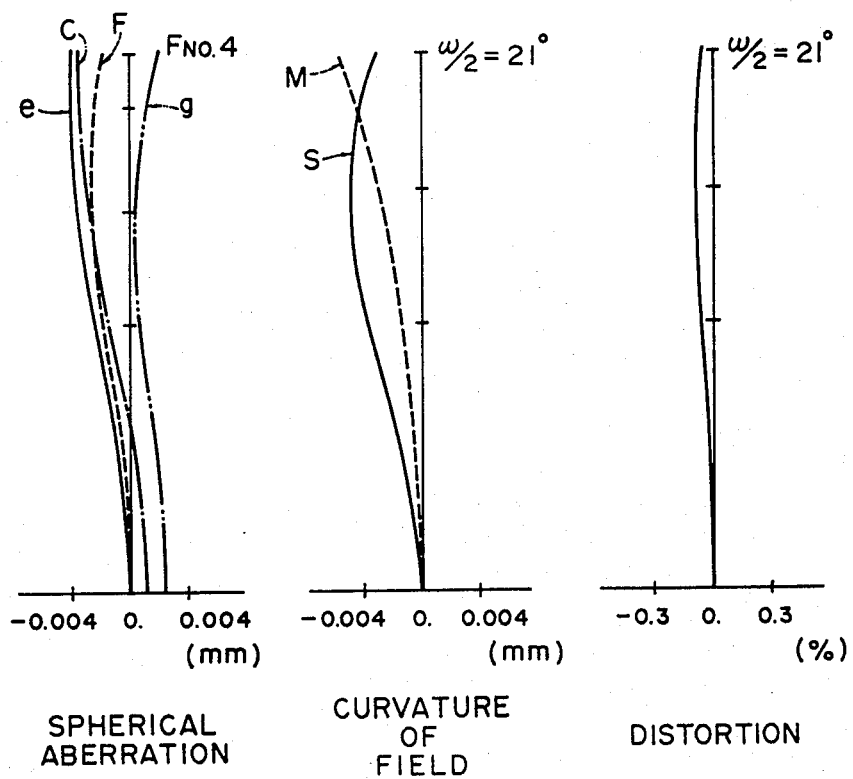
FIG. 2B shows the various longitudinal aberrations in Embodiment 2.

The longitudinal aberrations and lateral aberrations of the second embodiment are shown in FIG. 2B.

Figure 3A:
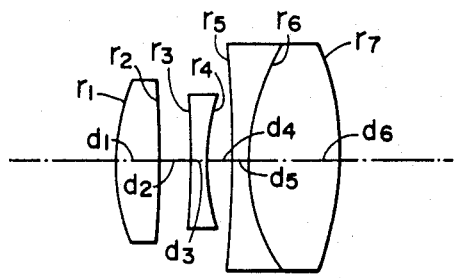
FIG. 3A shows a cross-section of the lens of Embodiment 3 of the present invention.

FIG. 3A shows the cross-sectional shape of a third embodiment of the projection lens according to the present invention. The numerical values of this embodiment are as follows:

| $f = 1$ | $F = 1:4$ | Angle of view = 42° | $\beta = -0.0893$ |
|---|---|---|---|
| $r_1 = 0.3954$ | $d_1 = 0.0883$ | $n_1 = 1.69401$ | $\nu_1 = 54.8$ |
| $r_2 = -4.8358$ | $d_2 = 0.0616$ | | |
| $r_3 = -0.6683$ | $d_3 = 0.0254$ | $n_2 = 1.61686$ | $\nu_2 = 37.0$ |
| $r_4 = 0.3473$ | $d_4 = 0.0631$ | | |
| $r_5 = -3.9209$ | $d_5 = 0.0393$ | $n_3 = 1.70443$ | $\nu_3 = 30.1$ |
| $r_6 = 0.3719$ | $d_6 = 0.1654$ | $n_4 = 1.81077$ | $\nu_4 = 40.9$ |
| $r_7 = -0.578$ | | | |
| $\|f_1/f_2\| = 1.4448$, | $\|f_2\|/f = 0.3672$, | $d_2/d_4 = 0.9768$, | |
| $f_3/f = 0.6656$, | $\|r_3\|/r_4 = 1.9242$, | $d_5 + d_6 = 0.2047f$ | |

Figure 3B:
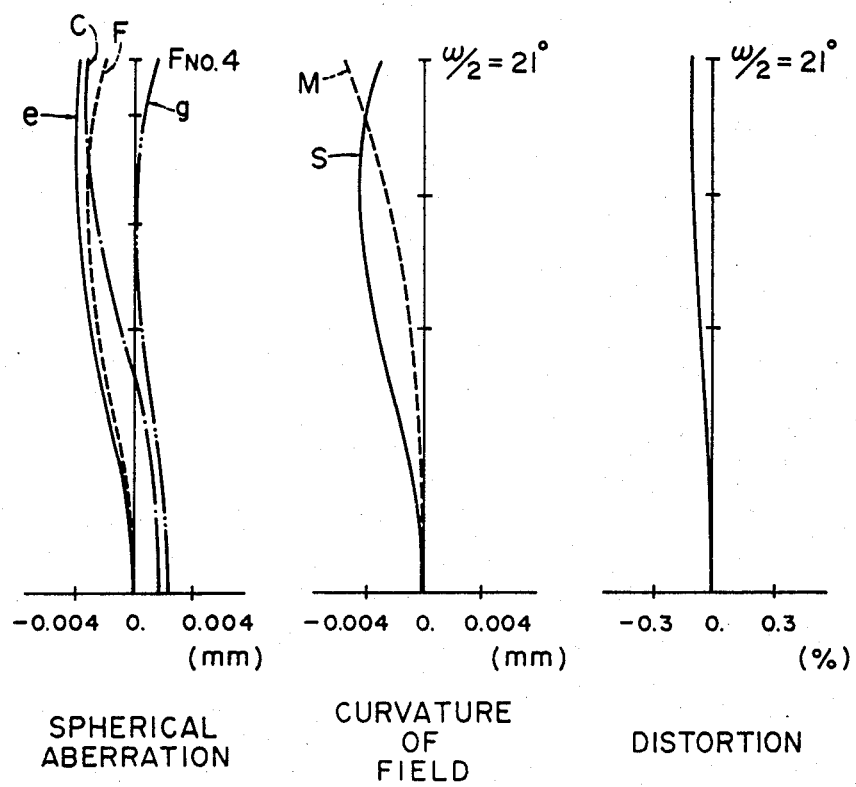
FIG. 3B shows the various longitudinal aberrations in Embodiment 3.

The longitudinal aberrations and lateral aberrations of the third embodiment are shown in FIG. 3B.

Figure 4A:
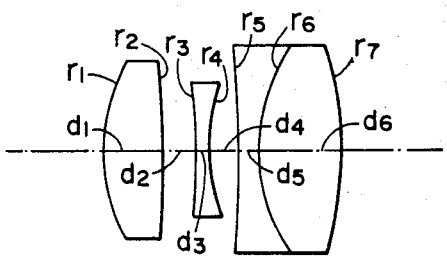
FIG. 4A shows a cross-section of the lens of Embodiment 4 of the present invention.

FIG. 4A shows the cross-sectional shape of a fourth embodiment of the projection lens according to the present invention. The numerical values of this embodiment are as follows:

| $f = 1$ | $F = 1:4$ | Angle of view = 42° | $\beta = -0.0893$ |
|---|---|---|---|
| $r_1 = 0.4323$ | $d_1 = 0.1197$ | $n_1 = 1.69401$ | $\nu_1 = 54.8$ |
| $r_2 = -3.3637$ | $d_2 = 0.0589$ | | |
| $r_3 = -0.5976$ | $d_3 = 0.0254$ | $n_2 = 1.61686$ | $\nu_2 = 37.0$ |
| $r_4 = 0.3672$ | $d_4 = 0.0573$ | | |
| $r_5 = -3.6595$ | $d_5 = 0.0365$ | $n_3 = 1.70443$ | $\nu_3 = 30.1$ |
| $r_6 = 0.3529$ | $d_6 = 0.1636$ | $n_4 = 1.81077$ | $\nu_4 = 40.9$ |
| $r_7 = -0.5417$ | | | |
| $\|f_1/f_2\| = 1.5309$, | $\|f_2\|/f = 0.3653$, | $d_2/d_4 = 1.0292$, | |
| $f_3/f = 0.6256$, | $\|r_3\|/r_4 = 1.6275$, | $d_5 + d_6 = 0.2001f$ | |

Figure 4B:
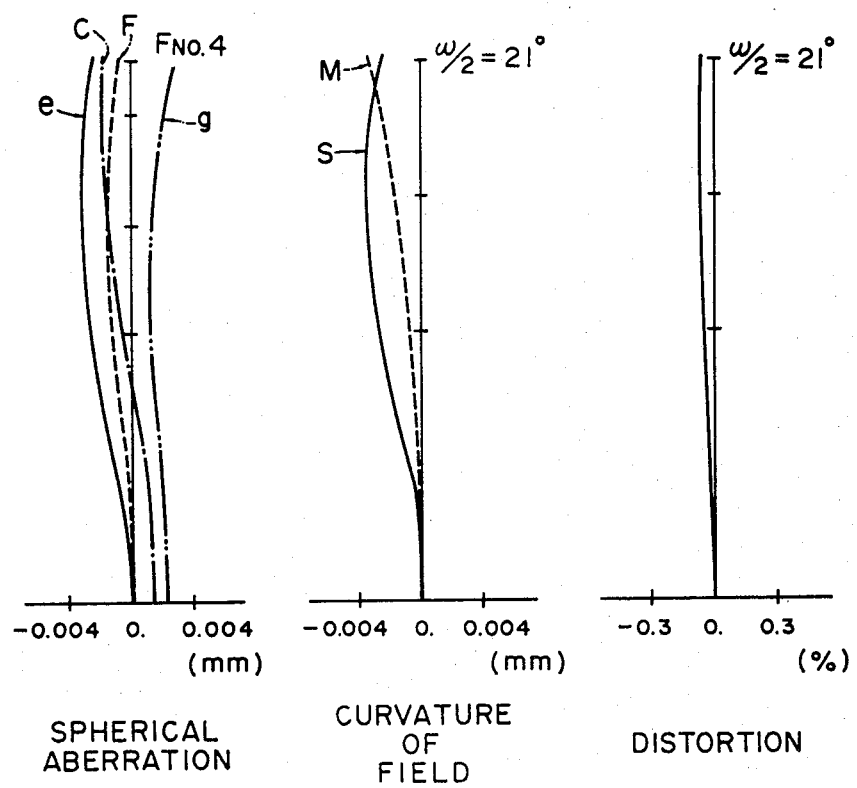
FIG. 4B shows the various longitudinal aberrations in Embodiment 4.

The longitudinal aberrations and lateral aberrations of the fourth embodiment are shown in FIG. 4B.

Figure 5A:
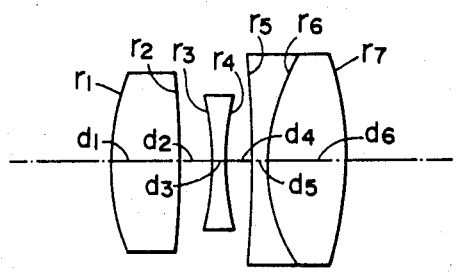
FIG. 5A shows a cross-section of the lens of Embodiment 5 of the present invention.

FIG. 5A shows the cross-sectional shape of a fifth embodiment of the projection lens according to the present invention. The numerical values of this embodiment are as follows:

| $f = 1$ | $F = 1:4$ | Angle of view = 40° | $\beta = -0.0893$ |
|---|---|---|---|
| $r_1 = 0.45$ | $d_1 = 0.1292$ | $n_1 = 1.69401$ | $\nu_1 = 54.8$ |
| $r_2 = -2.9124$ | $d_2 = 0.0588$ | | |
| $r_3 = -0.5621$ | $d_3 = 0.0254$ | $n_2 = 1.61686$ | $\nu_2 = 37.0$ |
| $r_4 = 0.3801$ | $d_4 = 0.0558$ | | |
| $r_5 = -3.0921$ | $d_5 = 0.036$ | $n_3 = 1.70443$ | $\nu_3 = 30.1$ |
| $r_6 = 0.3555$ | $d_6 = 0.1533$ | $n_4 = 1.81077$ | $\nu_4 = 40.9$ |
| $r_7 = -0.5172$ | | | |
| $\|f_1/f_2\| = 1.5667$, | $\|f_2\|/f = 0.3642$, | $d_2/d_4 = 1.0542$, | |
| $f_3/f = 0.6105$, | $\|r_3\|/r_4 = 1.4786$, | $d_5 + d_6 = 0.1569f$ | |

Figure 5B:
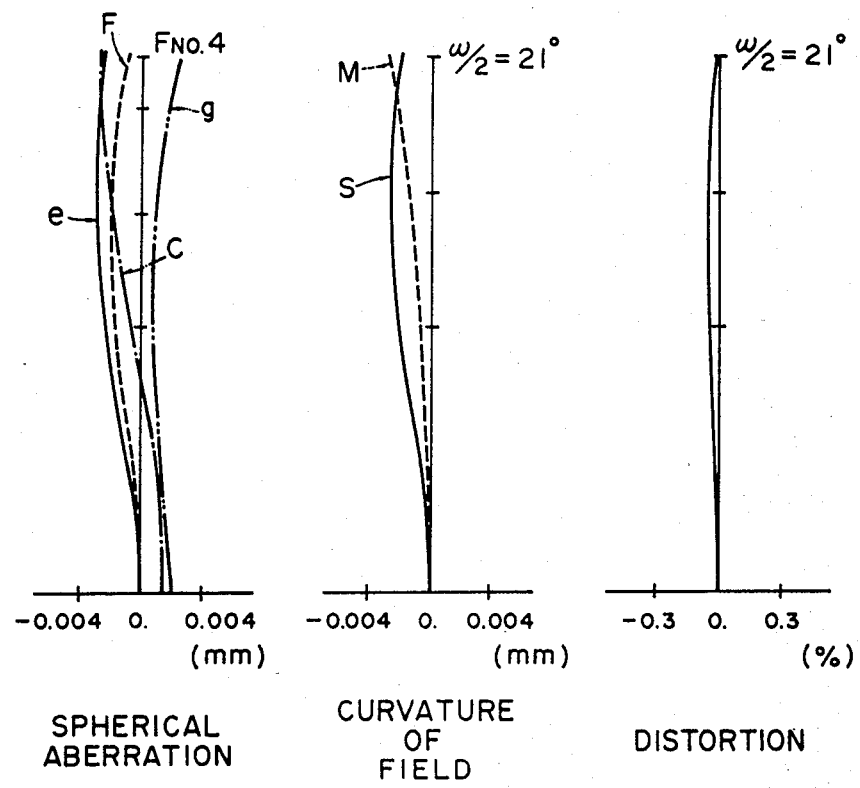
FIG. 5B shows the various longitudinal aberrations in Embodiment 5.

The longitudinal aberrations and lateral aberrations of the fifth embodiment are shown in FIG. 5B.

Figure 6A:
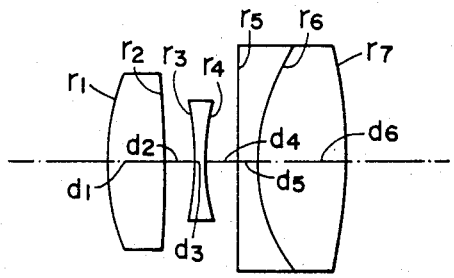
FIG. 6A shows a cross-section of the lens of Embodiment 6 of the present invention.

FIG. 6A shows the cross-sectional shape of a sixth embodiment of the projection lens according to the present invention. The numerical values of this embodiment are as follows:

| $f = 1$ | $F = 1:4$ | Angle of view = 42° | $\beta = -0.0893$ |
|---|---|---|---|
| $r_1 = 0.4002$ | $d_1 = 0.1177$ | $n_1 = 1.69401$ | $\nu_1 = 54.8$ |
| $r_2 = -9.2154$ | $d_2 = 0.0598$ | | |
| $r_3 = -0.72$ | $d_3 = 0.0254$ | $n_2 = 1.61686$ | $\nu_2 = 37.0$ |
| $r_4 = 0.3318$ | $d_4 = 0.0564$ | | |
| $r_5 = 17.1092$ | $d_5 = 0.0345$ | $n_3 = 1.70443$ | $\nu_3 = 30.1$ |
| $r_6 = 0.3156$ | $d_6 = 0.206$ | $n_4 = 1.81077$ | $\nu_4 = 40.9$ |
| $r_7 = -0.6436$ | | | |
| $\|f_1/f_2\| = 1.5214$, | $\|f_2\|/f = 0.3651$, | $d_2/d_4 = 1.0598$, | |
| $f_3/f = 0.632$, | $\|r_3\|/r_4 = 2.1702$, | $d_5 + d_6 = 0.2405f$ | |

Figure 6B:
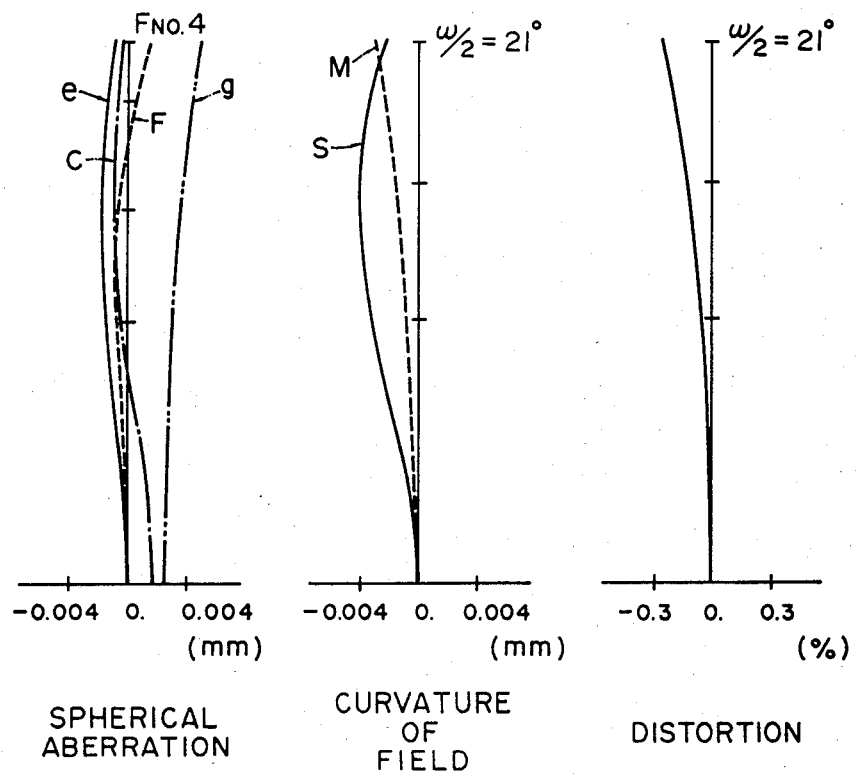
FIG. 6B shows the various longitudinal aberrations in Embodiment 6.

The longitudinal aberrations and lateral aberrations of the sixth embodiment are shown in FIG. 6B.

Figure 7A:
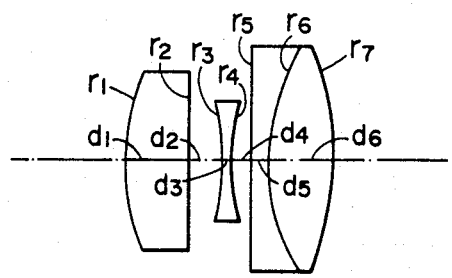
FIG. 7A shows a cross-section of the lens of Embodiment 7 of the present invention.

FIG. 7A shows the cross-sectional shape of a seventh embodiment of the projection lens according to the present invention. The numerical values of this embodiment are as follows:

| $f = 1$ | $F = 1:4$ | Angle of view = 42° | $\beta = -0.0893$ |
|---|---|---|---|
| $r_1 = 0.4951$ | $d_1 = 0.1344$ | $n_1 = 1.69401$ | $\nu_1 = 54.8$ |
| $r_2 = -3.8647$ | $d_2 = 0.0657$ | | |
| $r_3 = -0.519$ | $d_3 = 0.0248$ | $n_2 = 1.61686$ | $\nu_2 = 37.0$ |
| $r_4 = 0.41$ | $d_4 = 0.0418$ | | |
| $r_5 = -4.5772$ | $d_5 = 0.0294$ | $n_3 = 1.70443$ | $\nu_3 = 30.1$ |
| $r_6 = 0.3298$ | $d_6 = 0.1482$ | $n_4 = 1.81077$ | $\nu_4 = 40.9$ |
| $r_7 = -0.4875$ | | | |
| $\|f_1/f_2\| = 1.7426$, | $\|f_2\|/f = 0.3676$, | $d_2/d_4 = 1.5699$, | |
| $f_3/f = 0.5513$, | $\|r_3\|/r_4 = 1.2658$, | $d_5 + d_6 = 0.1776f$ | |

Figure 7B:
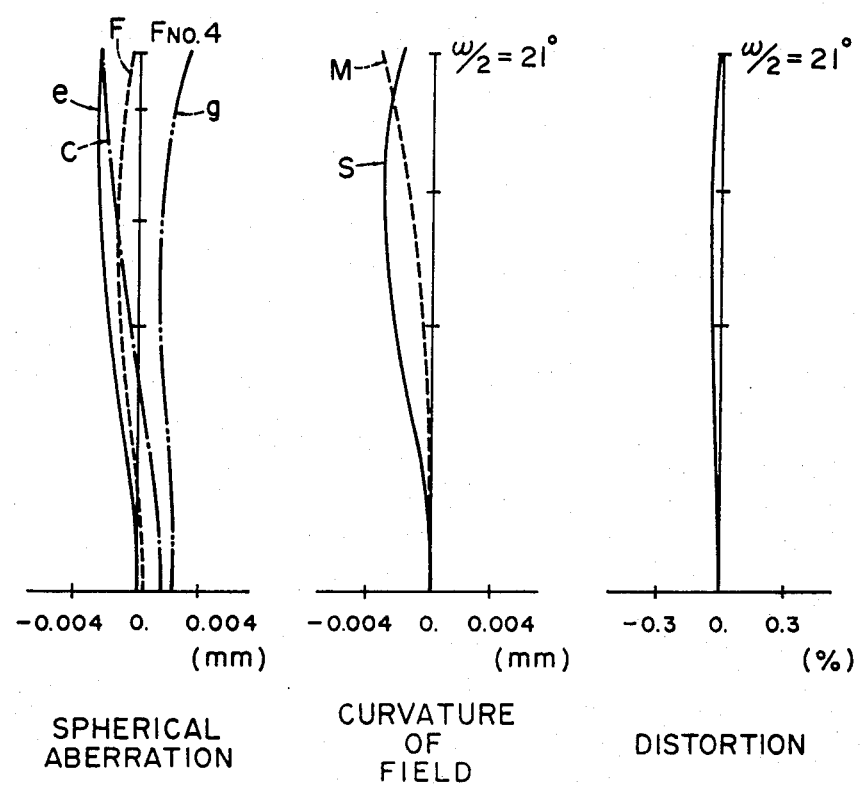
FIG. 7B shows the various longitudinal aberrations in Embodiment 7.

The longitudinal aberrations and lateral aberrations of the seventh embodiment are shown in FIG. 7B.

Figure 8A:
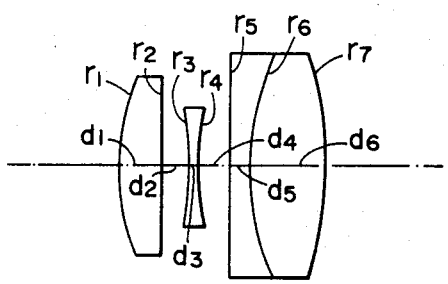
FIG. 8A shows a cross-section of the lens of Embodiment 8 of the present invention.

FIG. 8A shows the cross-sectional shape of an eighth embodiment of the projection lens according to the present invention. The numerical values of this embodiment are as follows:

| | | | |
|---|---|---|---|
| f = 1 | F = 1:4 | Angle of view = 42° | β = −0.0893 |
| $r_1 = 0.3703$ | $d_1 = 0.088$ | $n_1 = 1.69401$ | $\nu_1 = 54.8$ |
| $r_2 = -2.7358$ | $d_2 = 0.0511$ | | |
| $r_3 = -0.6468$ | $d_3 = 0.0248$ | $n_2 = 1.61686$ | $\nu_2 = 37.0$ |
| $r_4 = 0.3307$ | $d_4 = 0.0842$ | | |
| $r_5 = -2.5943$ | $d_5 = 0.039$ | $n_3 = 1.70443$ | $\nu_3 = 30.1$ |
| $r_6 = 0.4313$ | $d_6 = 0.1443$ | $n_4 = 1.81077$ | $\nu_4 = 40.9$ |
| $r_7 = -0.5801$ | | | |
| $|f_1/f_2| = 1.3526$, | $|f_2|/f = 0.3515$, | $d_2/d_4 = 0.6076$, | |
| $f_3/f = 0.7217$, | $|r_3|/r_4 = 1.9557$, | $d_5 + d_6 = 0.1833f$ | |

Figure 8B:
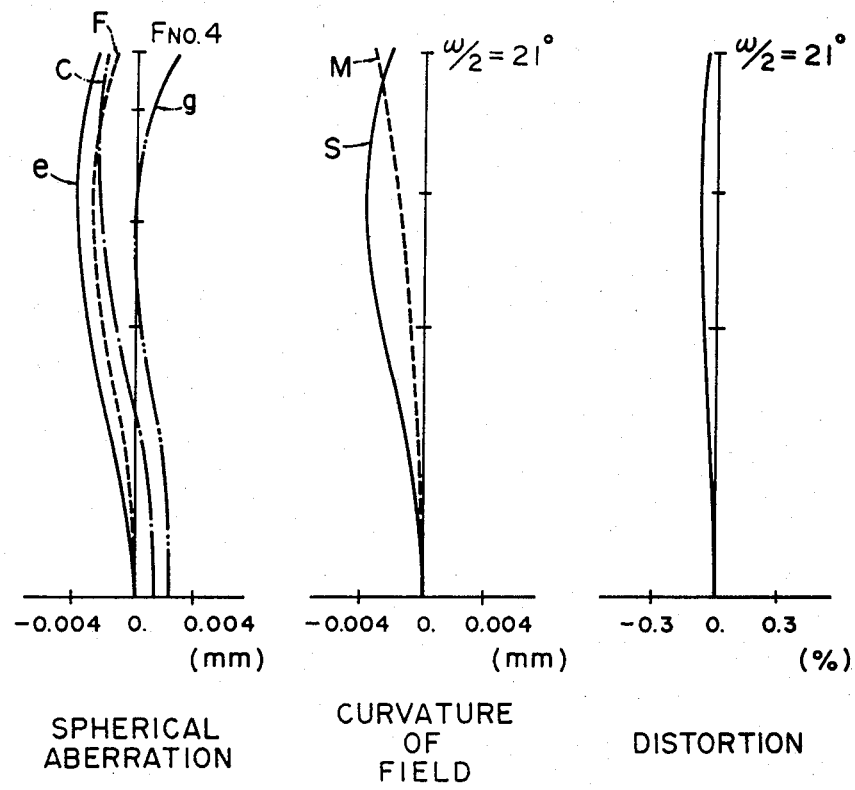
FIG. 8B shows the various longitudinal aberrations in Embodiment 8.

The longitudinal aberrations and lateral aberrations of the eighth embodiment are shown in FIG. 8B.

The sum of tertiary aberration coefficients of each embodiment so far described will be shown in the table below.

TABLE 1

| Coefficient | Example | | | | | | | |
|---|---|---|---|---|---|---|---|---|
| | Embodiment 1 | Embodiment 2 | Embodiment 3 | Embodiment 4 | Embodiment 5 | Embodiment 6 | Embodiment 7 | Embodiment 8 |
| I | 0.9944 | 1.0211 | 1.02703 | 0.84636 | 0.8606 | 0.5831 | 0.77741 | 1.11109 |
| II | 0.12128 | 0.06967 | 0.12444 | 0.05517 | 0.03147 | 0.0466 | −0.06134 | 0.19959 |
| III | −0.04451 | −0.03665 | −0.04394 | −0.05434 | −0.05449 | −0.05626 | −0.04902 | −0.04753 |
| P | 0.22763 | 0.22233 | 0.21336 | 0.20316 | 0.19756 | 0.21742 | 0.20049 | 0.20529 |
| V | 0.04909 | 0.02724 | 0.03446 | 0.02814 | 0.01946 | 0.04571 | 0.02277 | 0.02242 |

In the above table:
I: spherical aberration coefficient
II: coma coefficient
III: astigmatism coefficient
P: petzual sum
V: distortion coefficient As is apparent from the above-described embodiments, the projection lens according to the present invention satisfies the following conditions:

(1) $1.35 \leq |f_1/f_2| \leq 1.75$
(2) $0.35 \leq |f_2|/f \leq 0.38$
(3) $0.6 \leq d_2/d_4 \leq 1.57$
(4) $0.55 \leq f_3/f \leq 0.73$
(5) $1.26 \leq |r_3|/r_4 \leq 2.18$
(6) $0.15f \leq d_5 + d_6 \leq 0.25f$ where $f_1$ is the focal length of the first group lens, $f_2$ is the focal length of the second group lens, $d_2$ is the air space between the first group lens and the second group lens, $d_4$ is the air space between the second group lens and the third group lens, $r_3$ and $r_4$ are the curvature radii of the third and fourth refracting surfaces from the front, and f is the focal length of the entire system.

Condition (1) is for maintaining the balance of the refractive powers of the first and second group lenses and well correcting the spherical aberration thereof. That is, it is a condition for preventing the spherical aberration in such a manner as not to cast a great burden upon the refractive power of the concave lens of the second group. If $|f_1/f_2|$ is less than the lower limit, the spherical aberration will be under-corrected and if $|f_1/f_2|$ is greater than the upper limit, the spherical aberration will be over-corrected.

Condition (2) is for preventing the coma in such a manner as not to cast a great burden upon the second group lens within a range in which the Petzual sum can be corrected by the second group lens. If $|f_2|/f$ is less than the lower limit, the correction of the coma will become difficult and if $|f_2|/f$ is greater than the upper limit, the correction of the Petzual sum of the entire system will become difficult and the correction of the astigmatism will become difficult.

Condition (3) is concerned with the air spaces before and after the second group lens. If $d_2/d_4$ is less than the lower limit, the correction of the astigmatism will become difficult and if $d_2/d_4$ is greater than the upper limit, the curvature of field and coma will be increased.

Condition (4) is concerned with the refractive power of the third group lens. In the third group, the position through which the principal ray passes is more spaced apart from the optical axis than in the first and the second group and therefore, extreme distortion and curvature of field (astigmatism) occur. That is, if $f_3/f$ is less than the lower limit, negative distortion will occur and if $f_3/f$ is greater than the upper limit, the correction of the astigmatism will become difficult.

Condition (5) is concerned with the shape of the second group lens, and is particularly effective to maintain the balance of the coma. That is, by causing the ratio of refractive powers before and after the second group lens to satisfy condition (5), the coma can be well corrected.

Condition (6) is for lightening the burden of eliminating the spherical aberrations of the first and second groups by thickening the third group lens. If $d_5+d_6$ is less than the lower limit, the burden of eliminating the spherical aberration by the first and second groups will become greater, and the curvature of field and coma by the first and second groups will become too great to be corrected by the third group, thus aggravating the curvature of field and coma. If $d_5+d_6$ is greater than the upper limit, the position of the principal ray passing through the last surface of the third group will become spaced apart from the optical axis and therefore, a great deal of curvature of field will occur in the third group.

Thus, the present invention can provide a projection lens in which magnification is used in the vicinity of 1/10 times and F-number is relatively bright and the various aberrations are well corrected and which is inexpensive.

What I claim is:

1. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| | | | |
|---|---|---|---|
| f = 1, F = 1:4, Angle of view = 42°, β = −0.0893 | | | |
| $r_1 = 0.392$ | $d_1 = 0.0919$ | $n_1 = 1.69401$ | $\nu_1 = 54.8$ |
| $r_2 -6.9124$ | $d_2 = 0.0592$ | | |
| $r_3 = -0.7147$ | $d_3 = 0.0254$ | $n_2 = 1.61686$ | $\nu_2 = 37.0$ |
| $r_4 = 0.3442$ | $d_4 = 0.063$ | | |
| $r_5 = -6.4695$ | $d_5 = 0.0404$ | $n_3 = 1.70443$ | $\nu_3 = 30.1$ |
| $r_6 = 0.3656$ | $d_6 = 0.1675$ | $n_4 = 1.81077$ | $\nu_4 = 40.9$ |

-continued

| f = 1, F = 1:4, Angle of view = 42°, β = −0.0893 |
|---|
| $r_7 = -0.6089$ | where f is the focal length, F is the F-number, β is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\nu_1$ through $\nu_4$ represent the abbe's numbers of the respective lenses.

2. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| f = 1, F = 1:4, Angle of view = 42°, β = −0.0893 | | | |
|---|---|---|---|
| $r_1 = 0.4146$ | $d_1 = 0.0906$ | $n_1 = 1.69401$ | $\nu_1 = 54.8$ |
| $r_2 = -7.2484$ | $d_2 = 0.0648$ | | |
| $r_3 = -0.6537$ | $d_3 = 0.0254$ | $n_2 = 1.61686$ | $\nu_2 = 37.0$ |
| $r_4 = 0.3657$ | $d_4 = 0.0571$ | | |
| $r_5 = -4.3272$ | $d_5 = 0.0317$ | $n_3 = 1.70443$ | $\nu_3 = 30.1$ |
| $r_6 = 0.3574$ | $d_6 = 0.1508$ | $n_4 = 1.81077$ | $\nu_4 = 40.9$ |
| $r_7 = -0.5571$ | | | | where f is the focal length, F is the F-number, β is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\nu_1$ through $\nu_4$ represent the abbe's numbers of the respective lenses.

3. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| f = 1, F = 1:4, Angle of view = 42° β = −0.0893 | | | |
|---|---|---|---|
| $r_1 = 0.3954$ | $d_1 = 0.0883$ | $n_1 = 1.69401$ | $\nu_1 = 54.8$ |
| $r_2 = -4.8358$ | $d_2 = 0.0616$ | | |
| $r_3 = -0.6683$ | $d_3 = 0.0254$ | $n_2 = 1.61686$ | $\nu_2 = 37.0$ |
| $r_4 = 0.3473$ | $d_4 = 0.0631$ | | |
| $r_5 = -3.9209$ | $d_5 = 0.0393$ | $n_3 = 1.70443$ | $\nu_3 = 30.1$ |
| $r_6 = 0.3719$ | $d_6 = 0.1654$ | $n_4 = 1.81077$ | $\nu_4 = 40.9$ |
| $r_7 = -0.578$ | | | | where f is the focal length, F is the F-number, β is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\sigma_1$ through $\nu_4$ represent the abbe's numbers of the respective lenses.

4. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| f = 1, F = 1:4, Angle of view = 42°, β = −0.0893 | | | |
|---|---|---|---|
| $r_1 = 0.4323$ | $d_1 = 0.1197$ | $n_1 = 1.69401$ | $\nu_1 = 54.8$ |
| $r_2 = -3.3637$ | $d_2 = 0.0589$ | | |
| $r_3 = -0.5967$ | $d_3 = 0.0254$ | $n_2 = 1.61686$ | $\nu_2 = 37.0$ |
| $r_4 = 0.3672$ | $d_4 = 0.0573$ | | |
| $r_5 = -3.6595$ | $d_5 = 0.0365$ | $n_3 = 1.70443$ | $\nu_3 = 30.1$ |
| $r_6 = 0.3529$ | $d_6 = 0.1636$ | $n_4 = 1.81077$ | $\nu_4 = 40.9$ |
| $r_7 = -0.5417$ | | | | where f is the focal length, F is the F-number, β is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\nu_1$ through $\nu_4$ represent the abbe's numbers of the respective lenses.

5. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| f = 1, F = 1:4, Angle of view = 42°, β = −0.0893 | | | |
|---|---|---|---|
| $r_1 = 0.45$ | $d_1 = 0.1292$ | $n_1 = 1.69401$ | $\nu_1 = 54.8$ |
| $r_2 = -2.9124$ | $d_2 = 0.0588$ | | |
| $r_3 = -0.5621$ | $d_3 = 0.0254$ | $n_2 = 1.61686$ | $\nu_2 = 37.0$ |
| $r_4 = 0.3801$ | $d_4 = 0.0558$ | | |
| $r_5 = -3.0921$ | $d_5 = 0.036$ | $n_3 = 1.70443$ | $\nu_3 = 30.1$ |
| $r_6 = 0.3555$ | $d_6 = 0.1533$ | $n_4 = 1.81077$ | $\nu_4 = 40.9$ |
| $r_7 = -0.5172$ | | | | where f is the focal length, F is the F-number, β is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\nu_1$ through $\nu_4$ represent the abbe's numbers of the respective lenses.

6. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| f = 1, F = 1:4, Angle of view = 42°, β = −0.0893 | | | |
|---|---|---|---|
| $r_1 = 0.4002$ | $d_1 = 0.1177$ | $n_1 = 1.69401$ | $\nu_1 = 54.8$ |
| $r_2 = -9.2154$ | $d_2 = 0.0598$ | | |
| $r_3 = -0.72$ | $d_3 = 0.0254$ | $n_2 = 1.61686$ | $\nu_2 = 37.0$ |
| $r_4 = 0.3318$ | $d_4 = 0.0564$ | | |
| $r_5 = 17.1092$ | $d_5 = 0.0345$ | $n_3 = 1.70443$ | $\nu_3 = 30.1$ |
| $r_6 = 0.3156$ | $d_6 = 0.206$ | $n_4 = 1.81077$ | $\nu_4 = 40.9$ |
| $r_7 = -0.6436$ | | | | where f is the focal length, F is the F-number, β is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\nu_1$ through $\nu_4$ represent the abbe's numbers of the respective lenses.

7. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| $f = 1,$ | $F = 1:4,$ | Angle of view = 42°, | $\beta = -0.0893$ |
|---|---|---|---|
| $r_1 = 0.4951$ | $d_1 = 0.1344$ | $n_1 = 1.69401$ | $\nu_1 = 54.8$ |
| $r_2 = -3.8647$ | $d_2 = 0.0657$ | | |
| $r_3 = -0.519$ | $d_3 = 0.0248$ | $n_2 = 1.61686$ | $\nu_2 = 37.0$ |
| $r_4 = 0.41$ | $d_4 = 0.0418$ | | |
| $r_5 = -4.5772$ | $d_5 = 0.0294$ | $n_3 = 1.70443$ | $\nu_3 = 30.1$ |
| $r_6 = 0.3298$ | $d_6 = 0.1482$ | $n_4 = 1.81077$ | $\nu_4 = 40.9$ |
| $r_7 = -0.4875$ | | | | where f is the focal length, F is the F-number, $\beta$ is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\nu_1$ through $\nu_4$ represent the abbe's numbers of the respective lenses.

8. A projection lens comprising three groups of four components, said three groups comprising a first group from the front consisting of a biconvex single lens, a second group consisting of a biconcave single lens and a third group consisting of a positive lens comprising a negative lens and a positive lens cemented together, said projection lens satisfying the following conditions:

| $f = 1,$ | $F = 1:4,$ | Angle of view = 42°, | $\beta = -0.0893$ |
|---|---|---|---|
| $r_1 = 0.3703$ | $d_1 = 0.088$ | $n_1 = 1.69401$ | $\nu_1 = 54.8$ |
| $r_2 = -2.7358$ | $d_2 = 0.0511$ | | |
| $r_3 = -0.6468$ | $d_3 = 0.0248$ | $n_2 = 1.61686$ | $\nu_2 = 37.0$ |
| $r_4 = 0.3307$ | $d_4 = 0.0842$ | | |
| $r_5 = -2.5943$ | $d_5 = 0.039$ | $n_3 = 1.70443$ | $\nu_3 = 30.1$ |
| $r_6 = 0.4313$ | $d_6 = 0.1443$ | $n_4 = 1.81077$ | $\nu_4 = 40.9$ |
| $r_7 = -0.5801$ | | | | where f is the focal length, F is the F-number, $\beta$ is the magnification of the projection lens, $r_1$ through $r_7$ represent the curvature radii of the successive lens surfaces, $d_1$ through $d_6$ represent the thicknesses of the respective lenses and the intervals between adjacent lenses, $n_1$ through $n_4$ represent the refractive indices of the respective lenses for E-line, and $\nu_1$ through $\nu_4$ represent the abbe's numbers of the respective lenses.

* * * * *

UNITED STATES PATENT AND TRADEMARK OFFICE
CERTIFICATE OF CORRECTION

PATENT NO. : 4,370,032

DATED : January 25, 1983

INVENTOR(S) : MASAMICHI TATEOKA

It is certified that error appears in the above-identified patent and that said Letters Patent is hereby corrected as shown below:

Column 7, line 62, "$\sigma_1$" should read --$\nu_1$--

Signed and Sealed this

Sixth Day of September 1983

[SEAL]

Attest:

GERALD J. MOSSINGHOFF

*Attesting Officer*  *Commissioner of Patents and Trademarks*